United States Patent [19]
Milbourn

[11] Patent Number: 5,329,752
[45] Date of Patent: Jul. 19, 1994

[54] BRUSHCUTTER HEAD
[76] Inventor: David E. Milbourn, 54 Milbourn La., Hoquiam, Wash. 98550
[21] Appl. No.: 988,942
[22] Filed: Apr. 1, 1993
[86] PCT No.: PCT/US90/05109
  § 371 Date: Apr. 1, 1993
  § 102(e) Date: Apr. 1, 1993
[51] Int. Cl.⁵ .................. A01G 23/08; A01D 34/82
[52] U.S. Cl. ..................... 56/16.4; 56/16.8; 56/255; 144/3 D; 144/34 R
[58] Field of Search ................. 56/1, 12.1, 15.2, 16.4, 56/16.8, 233, 255, 295, 320.1, 320.2, DIG. 20, DIG. 24; 144/2 Z, 3 D, 27, 34 R, 336; 239/165, 169, 172, 175, 176, 289, DIG. 6, DIG. 8

[56]         References Cited
       U.S. PATENT DOCUMENTS

| | | | |
|---|---|---|---|
| 2,331,373 | 10/1943 | Campbell | 299/57 |
| 2,737,340 | 3/1956 | Bonini | 230/56 |
| 2,908,444 | 10/1959 | Mullin | 239/233 |
| 3,017,121 | 1/1962 | Carlson | 239/129 |
| 3,100,371 | 8/1963 | Redmon | 56/25.4 |
| 3,241,302 | 3/1966 | Barry | 56/25.4 |
| 3,857,515 | 12/1974 | Zennic | 239/162 |
| 3,866,397 | 2/1975 | Koziol | 56/16.8 |
| 3,982,697 | 9/1976 | Maples | 239/289 |
| 4,269,241 | 5/1981 | Hickman | 144/2 Z |
| 4,376,340 | 3/1983 | Ramun et al. | 30/134 |
| 4,446,897 | 5/1984 | Kurelek | 144/34 R |
| 4,491,163 | 1/1985 | Kurelek | 144/336 |
| 4,509,315 | 4/1985 | Giguere | 56/10.7 |
| 4,551,968 | 11/1985 | Samuelsson | 56/16.4 |
| 4,769,977 | 9/1988 | Milbourn | 56/15.2 |
| 4,793,389 | 12/1988 | Sigouin et al. | 144/34 R |
| 4,802,327 | 2/1989 | Roberts | 56/15.2 |
| 4,932,447 | 6/1990 | Morin | 144/34 R |
| 4,996,830 | 3/1991 | Davison | 56/15.2 X |

Primary Examiner—Ramon S. Britts
Assistant Examiner—James A. Lisehora
Attorney, Agent, or Firm—Joan H. Pauly

[57]           ABSTRACT

A brush cutter work head (20) has a protective shroud (36) with a vertical side opening (40) to expose a portion of a circular cutting blade (42) to enable the blade (42) to cut brush. A spray nozzle (82) is mounted on a sliding member (74) that slides within a tubular housing (58) incorporated into the work head housing (28). The sliding member (74) has a retracted position in which the nozzle (82) is positioned above a portion of the housing (28), and a projecting use position in which the nozzle (82) is aligned with the opening (40) above and outward of the blade (42). A gripping thumb (44) is pivotally mounted on the work head housing (28) and is operated by an actuator (52) within the housing (28) to pivot between a flush nonuse position and a gripping position in which it opposes a jaw (38) formed by a lower portion of the shroud (36).

24 Claims, 4 Drawing Sheets

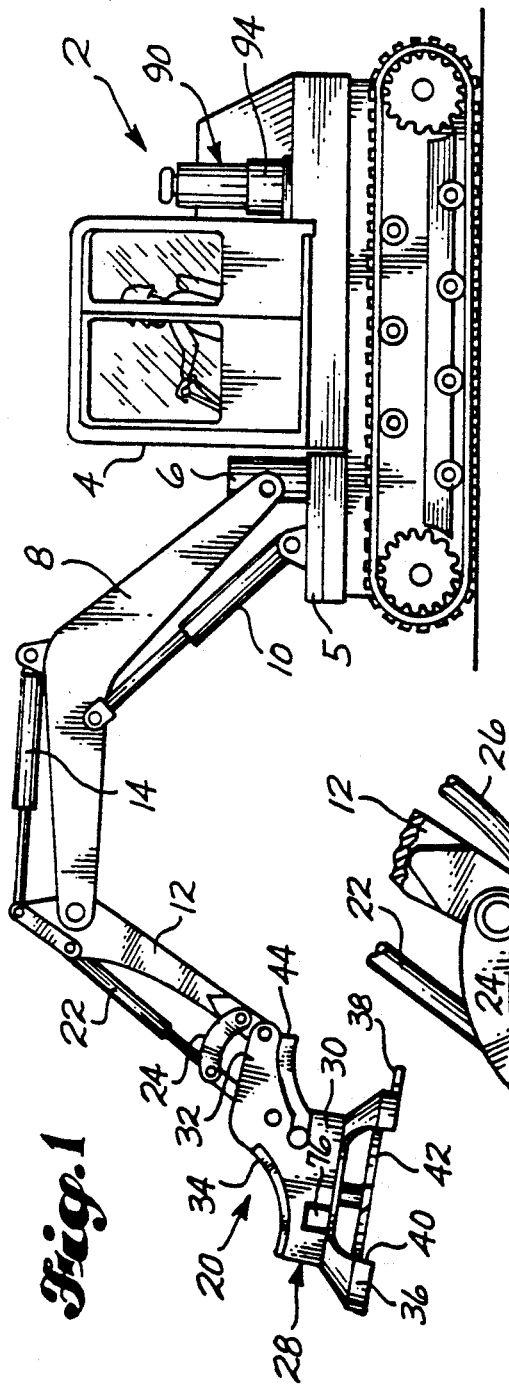
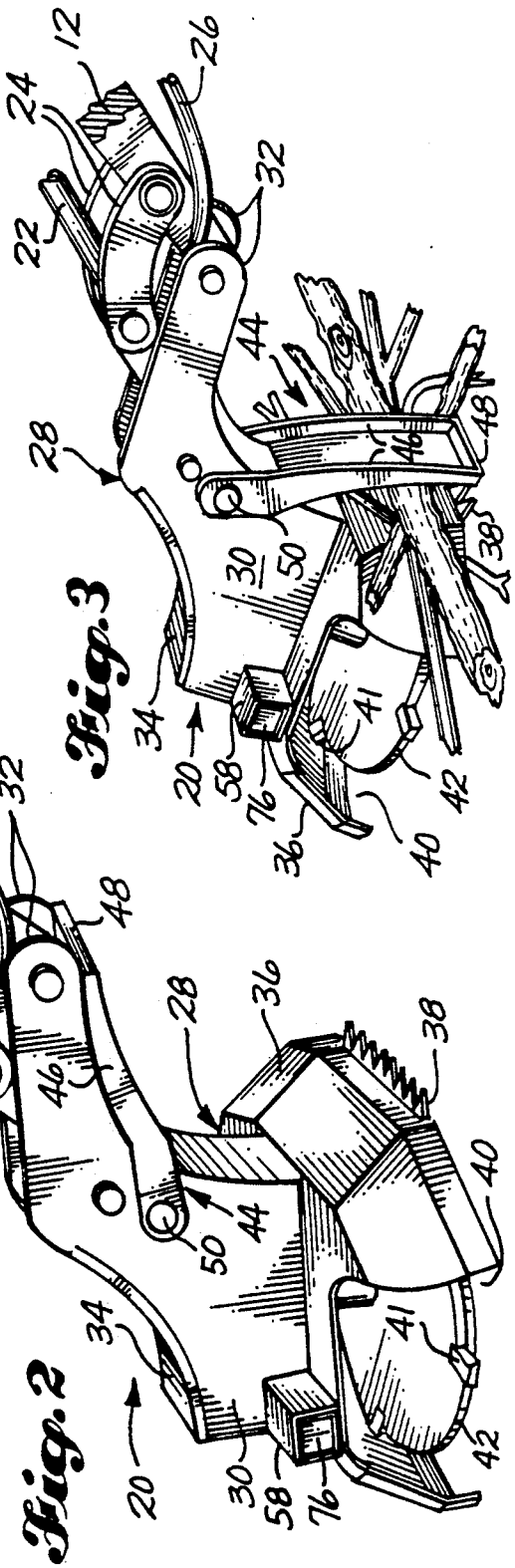
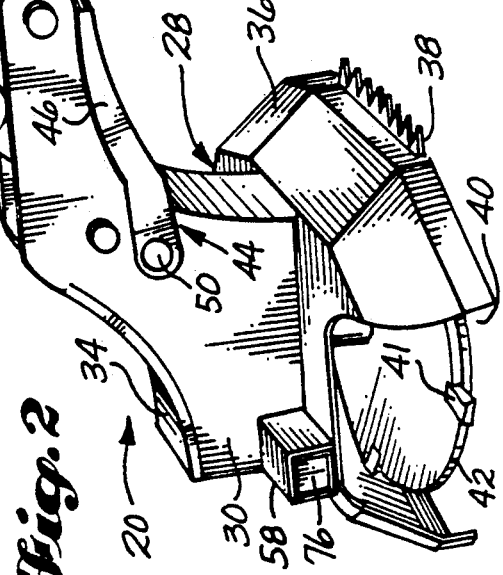

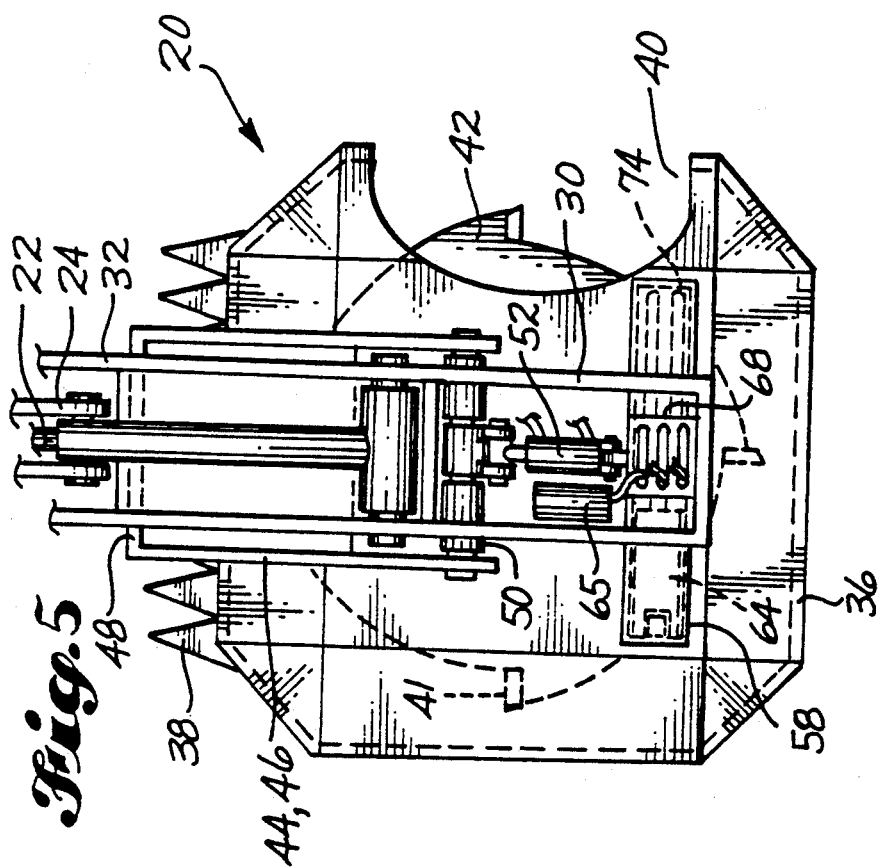

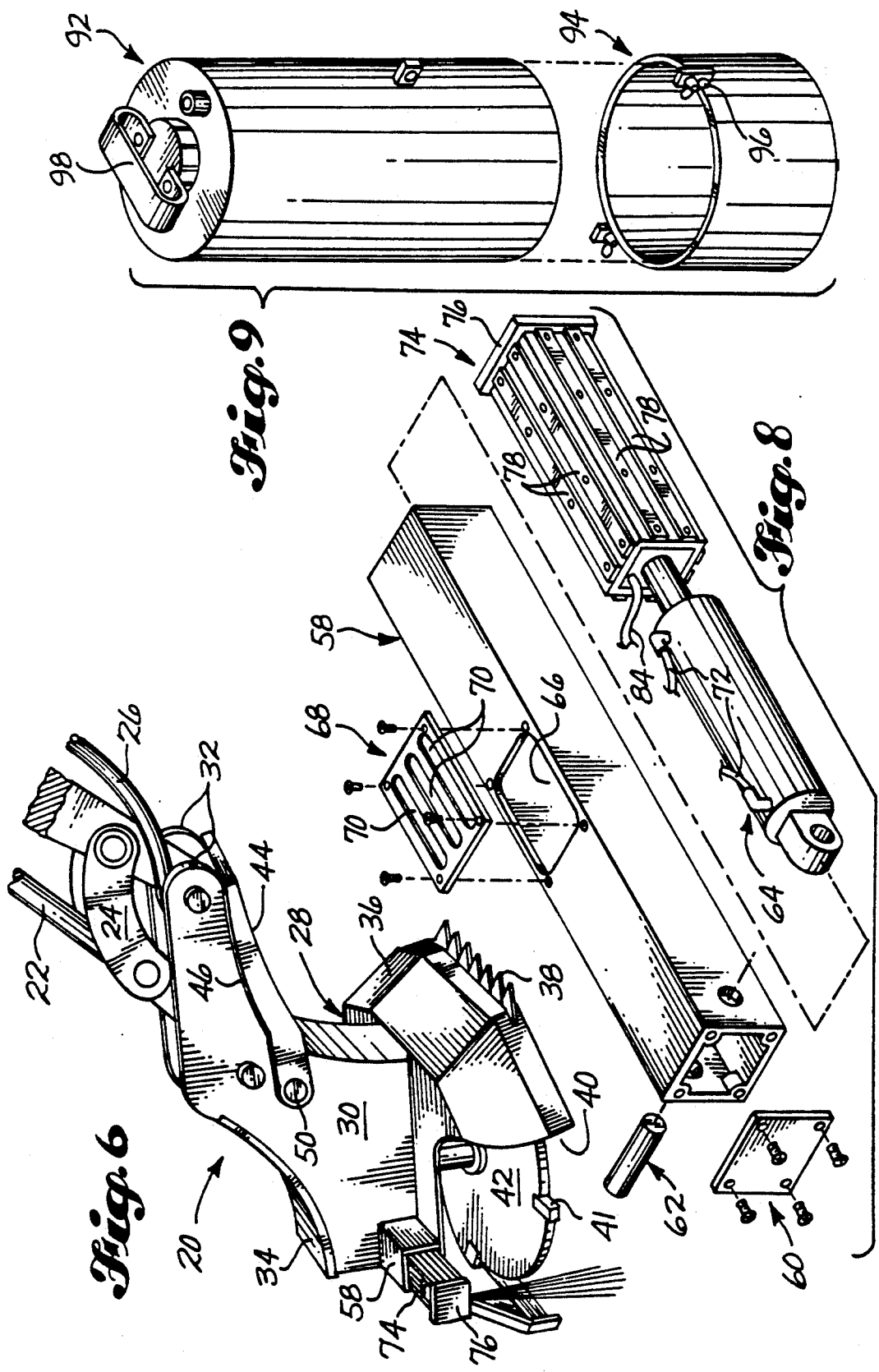

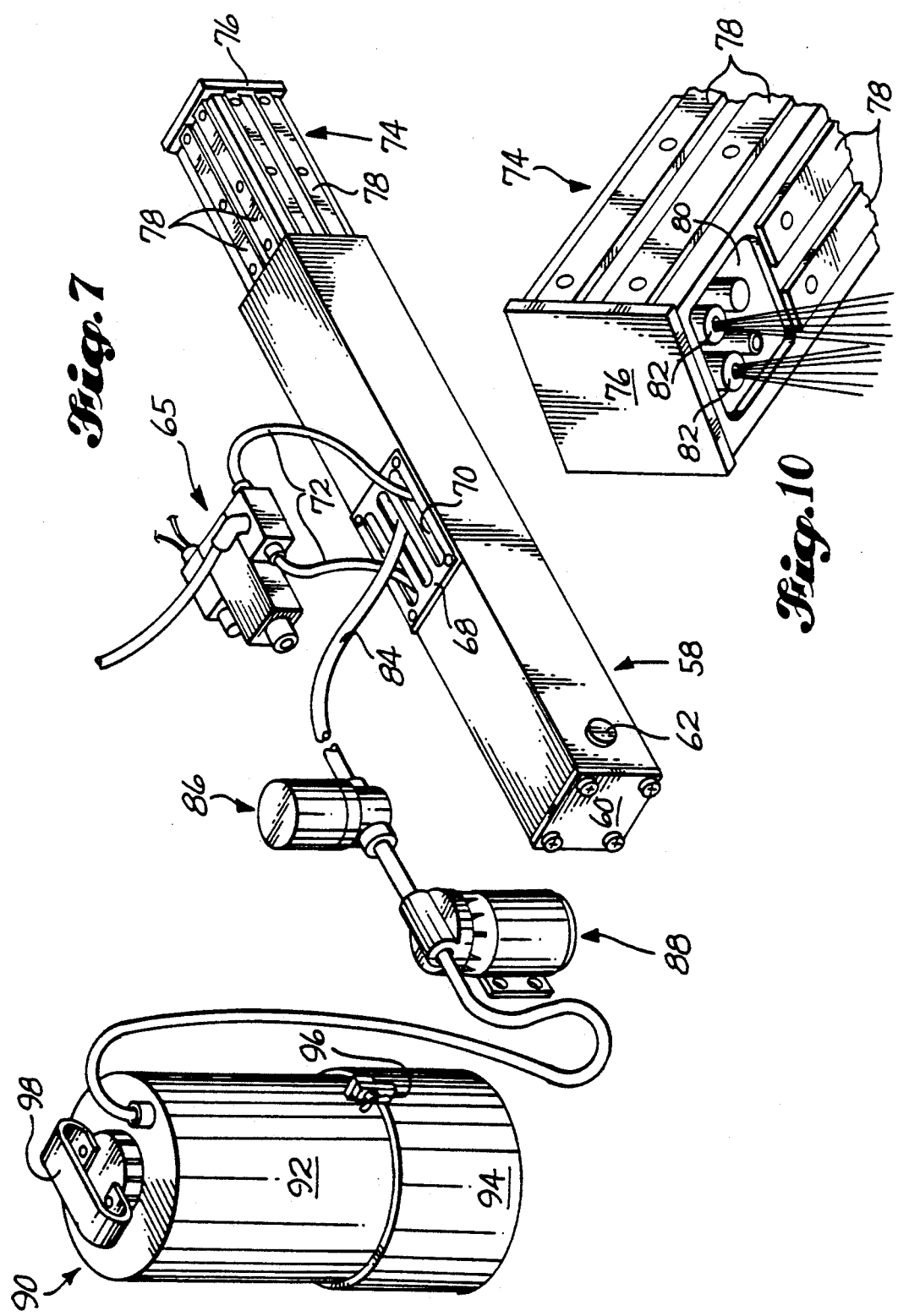

BRUSHCUTTER HEAD

TECHNICAL FIELD

This invention relates to brush cutting machines and, more particularly, to a brushcutter work head having a protective shroud with a blade opening, a retractable spray nozzle aligned with the opening, and a gripping thumb with a flush nonuse position.

BACKGROUND INFORMATION

Brush cutting operations have a variety of purposes. Some major purposes are clearing utility rights-of-way and road sides of obstructing vegetation and thinning trees for land management. In such situations, it is of course desirable to retard the regrowth of cut vegetation and maximize the period of time before the clearing or thinning operation needs to be repeated. One method of retarding regrowth is to spray the cut areas with suitable chemicals. Since cut vegetation, such as tree stumps, tends to heal over most immediately, it is important that any spraying operation be conducted as soon as possible after the cutting. For this reason, it is not unusual for a cutting contractor to be required to spray within ten minutes of cutting.

The need for prompt spraying of cut areas is difficult to meet because of the lack of availability of brush cutting equipment both suitable for clearing rights-of-way and/or tree thinning, and capable of spraying operations. Currently, the most common method of carrying out the spraying is to have a worker on foot with a back-carried chemical tank and a hand-held sprayer following the brush cutting machine. This procedure is very tedious and labor intensive and, therefore, quite costly. In addition, the procedure submits the worker to undesirable working conditions. Since the worker must maintain a safe distance from the brush cutting machine, the procedure also involves an unavoidable delay in the spraying following the cutting of the brush. Moreover, because of the relative remoteness of the cutting operation and the unavoidable covering over of cut areas with cut brush and debris, it is very difficult for the worker to accurately identify the areas that require spraying. Even when the areas are recognized, the nature of hand spraying generally leads to uneven coverage. The result tends to be overspraying and/or uneven spraying with areas of inadequate spraying.

Another problem associated with known brush cutting equipment is that elements mounted on the work head can obstruct cutting operations and are subject to contamination caused by contact with mud and debris and to damage caused by their becoming snagged on vegetation and other objects. This makes it difficult to mount gripping apparatus and actuators therefor on or near the work head without increasing repair and maintenance costs.

Spraying attachments for lawn mowers are disclosed in U.S. Pat. Nos. 2,737,340, granted Mar. 6, 1956, to R. A. Bonini; No. 2,908,444, granted Oct. 13, 1959, to A. R. Mullin; No. 3,017,121, granted Jan. 16, 1962, to V. W. Carlson; No. 3,100,371, granted Aug. 13, 1963, to P. C. Redmon; and No. 3,857,515, granted Dec. 31, 1974, to M. M. Zennie. The Bonini attachment is mounted on a platform of a lawn mower along with a motor, and is operable simultaneously or independently of the cutter and traction mechanisms to spray liquid. The location of the sprayer, which is connected to a platform-mounted compressor by a hose, is unclear. Mullin discloses a spraying attachment for a lawn mower having a rotating cutting bar similar to a fan blade. The spraying attachment is mounted on the drive shaft above the cutting bar. Centrifugal force carries liquid through circumferential slots, and the liquid is deflected downwardly so that it is dispensed only beneath the mower. Carlson and Zennie each disclose an attachment for a power lawn mower that has a perforated manifold mounted in a fixed position laterally offset from the mower. The Carlson attachment is powered by the exhaust of the mower. The Zennie attachment is operated by a blower powered by the mower engine. Redmon discloses an attachment for a lawn mower having a hopper mounted on the mower housing that dispenses liquid onto the blade or in the blade's path only when the mower is moving.

U.S. Pat. Nos. 3,982,697, granted Sep. 28, 1976, to H. E. Maples, discloses a spraying attachment for a type of mower used on golf course greens. The liquid is received from a remote source through an intake mounted above the mower and is dispensed behind the mower. The attachment has valves to control the dispensing of the liquid. U.S. Pat. No. 4,551,968, granted Nov. 12, 1985, to B. A. Samuelsson, discloses a sprayer mounted on a self-propelled harvester. The sprayer includes a tubular liquid applicator with a plurality of nozzles. The applicator is positioned behind a front cutting device. The applicator sprays weed killer following the cutting of a crop but before the crop residue is deposited.

U.S. Pat. No. 2,331,373, granted Oct. 12, 1943, to F. A. Campbell, discloses a liquid discharge appliance for fire fighting, horticulture, or spraying buildings. The appliance resembles a rigid hose and has tubes that are extended telescopically relative to each other by a fluid flowing into the appliance. Mower attachments having a housing with a blade-exposing opening are disclosed in U.S. Pat. Nos. 3,241,302, granted Mar. 22, 1966, to R. O. Barry; No. 4,509,315, granted Apr. 9, 1985, to N. Giguere; and No. 4,802,327, granted Feb. 7, 1989, to C. A. Roberts.

Gripping mechanisms are shown in U.S. Pat. Nos. 4,269,241, granted May 26, 1981, to L. Hickman; No. 4,376,340, granted Mar. 15, 1983, to M. Ramun et al.; No. 4,446,897, granted May 8, 1984, to J. Kurelek; and No. 4,491,163, granted Jan. 1, 1985, to J. Kurelek. The Ramun et al. device is an attachment for a backhoe in which the gripping jaws have inner edges with a scissor-like action. The other three patents disclose tree felling apparatus in which the tree is gripped during the cutting.

DISCLOSURE OF THE INVENTION

The invention is directed toward brush cutting apparatus. According to an aspect of the invention, a work head for a brush cutting machine comprises a housing and a cutting blade carried by the housing. The housing includes a protective shroud with a vertical opening therein to expose a portion of the blade to enable the blade to cut brush. A spray nozzle is also carried by the housing. The nozzle has a spray position in which it is substantially aligned with the opening above and outward of the exposed portion of the blade. An activator is remote from the housing and operatively connected to the nozzle for selectively spraying liquid therefrom. Preferably, the nozzle is slidably retractable into a nonuse position. Also preferably, the opening extends through a side portion of the shroud, and, in its spray position, the nozzle is positioned laterally outwardly of the exposed portion of the blade.

The features of the invention described above may be incorporated into various types of work heads. For example, the blade may be a generally circular rotary cutting blade mounted to rotate about a vertical axis and to extend radially outwardly through the vertical opening in the shroud. The work head may also be provided with additional preferred features in accordance with the invention. For example, the nozzle may be adjustable and/or a plurality of nozzles may be provided to allow adjustability and flexibility in the spray pattern of the liquid. The provision of a plurality of nozzles also allows the selective spraying of two or more different liquids.

The invention encompasses the work head described above, by itself, as well as such work head in combination with a boom having an end portion to which the work head is pivotally attached.

According to another aspect of the invention, the brush cutting apparatus comprises the combination of a boom having opposite end portions, and a work head pivotally attached to one of the end portions. The work head includes a housing and a cutting blade carried by the housing. The housing includes a protective shroud surrounding a portion of the blade. A spray nozzle is mounted on the housing and is slidable between a nonuse position and a spray position. In the nonuse position, the nozzle is positioned above a portion of the housing. In the spray position, the nozzle projects horizontally outwardly from the housing to permit liquid to be sprayed downwardly from the nozzle onto cut brush. An activator remote from the housing is operatively connected to the nozzle for selectively spraying liquid therefrom. The slidability of the nozzle between the two positions has the advantage of allowing the nozzle to be positioned during cutting operations in a nonuse position in which it does not obstruct cutting operations and is not vulnerable to contamination or damage.

According to another aspect of the invention, a work head for a brush cutting machine comprises a housing, a cutting blade carried by the housing, and a gripping jaw carried by a lower portion of the housing. A thumb is pivotally mounted on the housing to pivot about a horizontal axis. The thumb pivots from a nonuse position toward the jaw to thereby grip cut brush and other debris between the thumb and the housing. In the nonuse position, the thumb is at least substantially flush against an upper portion of the housing. An actuator is mounted inside the housing and connected to the thumb to pivot the thumb about its axis. This combination of features in a work head provides the head with the ability to grip debris while avoiding the problems of contamination and obstruction discussed above. The flush positioning of the thumb in its nonuse position and the mounting of the actuator inside the housing protect the thumb and the actuator and prevent these elements from affecting the cutting operation.

The spraying aspects of the invention provide a flexible, cost effective means of carrying out required spraying and brush cutting operations. The positioning of the spray nozzle on the cutting head allows the spraying to be carried out immediately as soon as an area has been cut. The immediate spraying prevents any healing over of cut stumps and other vegetation from occurring prior to the spraying. Therefore, the effectiveness of the spraying is maximized. The positioning of the spray nozzle on the work head and the provision of a remote activator also allow the spraying to be carried out quickly and easily by the operator of the brush cutting machine. This eliminates the need for an additional worker on foot and greatly reduces labor costs. Moreover, the machine operator can be isolated from the chemical being sprayed without impeding the spraying operation. Since the machine operator has just carried out the cutting operation, the operator has accurate first-hand knowledge of the spots that require spraying. This allows the operator to spray only where needed. It also prevents the problem of uneven spraying and missed spots encountered in the conventional hand spraying procedure. The feature of the invention of a spray nozzle that extends laterally from the work head provides the operator with maximum visibility to help maximize the accuracy of the spraying. The retractability of the nozzle helps protect the nozzle and avoid the problems of contamination and obstruction discussed above. The positioning of the nozzle, in its spray position, in alignment with the blade opening in the shroud allows maximized compactness of the work head in the spraying configuration while preventing chemicals from being sprayed directly onto the housing or the blade.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is an elevational view of a brush cutting machine incorporating the preferred embodiment of the invention.

FIG. 2 is a pictorial view of the preferred embodiment of the work head showing the spray nozzles and the thumb in their nonuse positions.

FIG. 3 is like FIG. 2 except that it shows the thumb being used to grip cut brush.

FIG. 4 is a bottom plan view of the work head shown in FIGS. 1-3 with the nozzles in their spray position.

FIG. 5 is a top plan view of the work head shown in FIGS. 1-4, with the upper cover removed.

FIG. 6 is like FIG. 2 except that it shows the nozzles in their extended spray position spraying liquid.

FIG. 7 is a pictorial view of the components of the spraying system of the preferred embodiment.

FIG. 8 is an exploded pictorial view of portions of the apparatus shown in FIG. 7.

FIG. 9 is an exploded pictorial view of the reservoir and its base mount shown in FIG. 7.

FIG. 10 is a fragmentary pictorial view of the nozzles and their sliding mount shown in FIGS. 6-8.

BEST MODE FOR CARRYING OUT THE INVENTION

The drawings show brush cutting apparatus that is constructed according to the invention and that constitutes the best mode for carrying out the invention currently known to the applicant. As shown in FIG. 1, the apparatus is attached to a tractor 2 of a common type in a two-boom arrangement. The tractor 2 and related structure are shown herein for the purpose of illustrating an installation of the apparatus of the invention. It is, of course, to be understood that the invention may also be used to advantage in connection with other types of tractors, backhoes, and similar machines, and with other boom arrangements. One example of another suitable boom arrangement is the three-boom structure disclosed in the applicant's U.S. Pat. No. 4,769,977, granted Sep. 13, 1988.

Referring to FIG. 1, the tractor 2 has a cab 4 for the operator and a turntable 5 mounted to pivot about a vertical axis. A vertical post 6 is mounted on the turntable 5. A boom 8 of a known type is pivotally mounted on the post 6 to pivot about a horizontal axis. A hydraulic actuator 10 pivots the boom 8. An outer boom or stick 12 is pivotally mounted on the outer end of the inner boom 8. The stick 12 is pivoted relative to the boom 8 in a known manner by a hydraulic actuator 14. The actuator 14 is carried by the boom 8.

Referring to FIGS. 1-6, the illustrated preferred embodiment of the work head 20 of the invention is pivotally mounted on the outer end of the stick 12. As noted above, the invention encompasses both the work head 20, by itself, and the combination of the work head 20 and the stick 12. The work head 20 is pivotal relative to the stick 12 about a horizontal axis. The pivoting of the work head 20 is accomplished by a hydraulic actuator 22 that is pivotally attached to the stick 12 and engages an upper rear yoke portion 32 of the work head 20. The stick 12 is pivotally attached to the yoke 32 and is connected to the piston portion of the actuator 22 by a pair of links 24. A wrapped bundle of cables 26 extends outwardly and rearwardly from the yoke 32 and along the boom structure in a known manner to the control system of the tractor 2. The bundle 26 includes hydraulic hoses and wiring for operating the cutting blade 42 and spraying mechanism, described further below.

The work head 20 includes a housing 28. The upper portion 30 of the housing 28 is vertical and terminates at its upper end in a rearwardly projecting yoke 32, mentioned above. Forward of the yoke 32, the top of the upper vertical portion 30 has a removable cover 34. The cover 34 at least substantially seals the upper portion 30 of the housing 28 to exclude mud and debris and thereby protect the components mounted therein. The lower portion of the housing 28 forms a protective shroud 36. A jaw 38 comprising a plurality of teeth is formed on the lower rear edge of the shroud 36. A generally circular horizontal rotary cutting blade 42 is mounted on the housing 28 to rotate about a vertical axis. The peripheral edge of the blade 42 is substantially surrounded by the shroud 36. The mounting structure for the blade 42 may take various forms and preferably includes the dirt seal arrangement described in the applicant's above-mentioned U.S. Pat. No. 4,769,977. The arrangement of cutting edges on the blade 42 may also be varied considerably. A currently preferred configuration is best seen in FIG. 4. It has four peripheral cutting teeth 41 and four teeth 43 on its bottom face.

The shroud 36 has a vertical side opening 40 extending therethrough to expose a portion of the blade 42 to enable the blade 42 to engage and cut brush. Brush cutting heads are conventionally provided with openings in protective shrouds for this purpose. However, the openings are commonly in the front of the work head, rather than in a side portion of the work head, as in the preferred embodiment of the work head 20 shown in the drawings and described herein.

A gripping thumb 44 is also pivotally mounted on the work head 20. An advantage of providing the thumb 44 mounted directly on the work head 20 is that, when the work head 20 is installed on an existing articulated boom structure, the structure is automatically provided with gripping, as well as cutting, capability. The thumb 44 is pivotal about a horizontal axis between a nonuse position in which it is substantially flush against the lower surface of the yoke 32, and a gripping position in which it cooperates with the jaw 38 to grip cut brush and other debris between the housing 28 and the thumb 44. The flush nonuse position is shown in FIGS. 1, 2, and 6. The gripping position is illustrated in FIGS. 3-5. As can best be seen in FIG. 3, the thumb 44 has opposite side flanges 46 and an outer end flange 48 extending rearwardly (in the gripping position) or upwardly (in the nonuse position) therefrom. In the nonuse position, these flanges 46, 48 extend around the lower edge portions of the yoke 32 to enhance the flush engagement thereof by the thumb 44.

The hydraulic actuator 52 for the thumb 44 can be seen in FIG. 5. The actuator 52 is mounted inside the upper vertical portion 30 of the housing 28. It is visible in FIG. 5 because the cover 34 has been removed. The actuator 52 is operated to pivot a pivot/anchor pin 50. The pin 50 is keyed to the thumb 44 so that pivoting of the pin 50 causes pivoting of the thumb 44, toward the jaw 38 to grip brush and other debris, and in the opposite direction toward its nonuse position shown in FIGS. 1, 2, and 6. The actuator 52 is a conventional double acting hydraulic cylinder that is plumbed into the hydraulic system of the tractor 2. The positioning of the actuator 52 and the pin 50 inside the sealed housing portion 30 gives the thumb operating mechanism maximal protection to help minimize maintenance and repair costs relating to the thumb. (It should be noted that components not relevant to the present invention have been omitted from FIG. 5 for purposes of clarity.)

The preferred embodiment of the spraying mechanism of the invention includes a square tubular housing 58. The tubular housing 58 is mounted on and integrated into the work head housing 28. The tube 58 extends through the front portion of the vertical upper portion 30 of the work head housing 28. As can be seen in FIGS. 2, 3, 5, and 6, the opposite ends of the tubular housing 58 project laterally outwardly from the upper housing portion 30.

Referring to FIGS. 7 and 8, one end of the tubular housing 58 is closed by an end plate 60. The upper surface of the housing 58 has an opening 66 formed therein. The housing 58 is provided with an anti-abrasion bearing plate 68 that is secured to the upper surface and covers the opening 66. The plate 68 has three elongated slots 70 extending therethrough to permit hoses 72, 84 to extend upwardly out from the housing 58 through the slots 70, as shown in FIG. 7. A sliding member 74 and a hydraulic actuator 64 therefor are received in the housing 58. These elements are visible in the exploded view shown in FIG. 8. The actuator 64 is held in position by an anchor pin 62 that extends through suitable holes in the sides of the housing 58. The actuator 64 is operable to slide the sliding member 74 between a nonuse retracted position, shown in FIGS. 1-3 and 5, and a projecting use position shown in FIGS. 4, 6, and 7. In the retracted nonuse position, an end plate 76 carried by the sliding member 74 closes the end of the tubular housing 58 opposite the fixed end plate 60. In the projecting use position (spray position), the sliding member projects horizontally laterally outwardly from the housings 28, 58. The sliding member 74 has two bearing strips 78 attached to each of its four elongated sides to ensure smooth sliding of the member 74 in the housing 58. Like the bearing plate 68, the strips 78 are formed by a durable chemical resistant material, such as nylon.

As can be seen in FIG. 10, the lower surface of the sliding member 74 has an opening 80 formed therein. Two nozzles 82 are mounted in the member 74 and are positioned to spray liquid, such as herbicide, downwardly through the opening 80. The liquid is supplied to the nozzles 82 through a hose 84 which extends out through the rear portion of the sliding member 74 and upwardly out of the tubular housing 58 through one of the slots 70 in the bearing plate 68, as can be seen in FIGS. 7 and 8. The hose 84 is preferably made from durable, chemical resistant materials. An example of a suitable hose is the hose sold under the trademark Dayco and having a stainless steel braided jacket with a Teflon (trademark) liner.

FIG. 7 also shows the other components of the spraying system. The system includes a hydraulic valve 65 which may be of various known types. This valve 65 is connected by two hoses 72 to the actuator 64 to operate the actuator 64. The valve 65 may be installed in various locations on the brush cutting equipment. As shown in FIG. 5, a convenient location is inside the upper vertical portion 30 of the work head housing 28 adjacent to the thumb actuator 52. The hoses 72 extend from the valve 65 into the tubular housing 58 through two of the slots 70 in the bearing plate 68.

Still referring to FIG. 7, the hose 84 that delivers the liquid to the nozzles 82 is connected at its far end to a filter 86. The filter 86 is in turn connected to a pump 88 which is connected to a reservoir 90. In the illustrated embodiment, the pump 88 is electric and is operated, like the hydraulic components of the apparatus shown in FIG. 1, from the cab of the tractor 2. The filter 86, pump 88, and reservoir 90 may be mounted in any convenient location on the brush cutting apparatus. At present, it is preferred to mount these elements on the tractor 2 outside the cab 4, as shown in FIG. 1. In this preferred arrangement, the entire activating mechanism for the nozzles 82 is located remotely from the work head 20. In other embodiments, portions of the activating mechanism, such as the filter 86 and/or pump 88, could be located on or near the work head 20. However, at least a trigger mechanism should be located remotely, preferably in the cab 4, to isolate the operator from the chemicals and maximize the ease of operation.

FIG. 9 is an exploded view of the reservoir apparatus. The reservoir 90 comprises a main body 92 which forms a container for the liquid. It also comprises a base 94 into which the lower portion of the container 92 is slidably received. Releasable latches 96 secure the connection between the container 92 and the base 94. The container 92 has a handle 98 on its upper end to allow it to be manually removed from the base 94. As shown in FIGS. 7 and 9, the latches 96 are tightened by wing nuts. The latches could also take a variety of other forms. For example, snap latches would have the advantage of quick and easy operation. The two-part construction of the reservoir 90 allows the easy resupply of the spraying mechanism with the desired liquid chemical while maintaining a secure mount of the reservoir on the tractor 2. When empty, the container 92 may be quickly and easily released from the latch engagement and removed from the base 94. The empty container 92 may then be replaced with a different full container or refilled at a convenient location.

The drawings show a single liquid delivery system for the nozzles, including the hose 84, filter 86, pump 88, and reservoir 90. This system can be connected to either or both nozzles 82. The apparatus of the invention could also include an additional liquid delivery system including, for example, the same elements 84, 86, 88, 90 as the illustrated system. In such case, the two reservoirs 90 could contain two different liquids, such as two different herbicides or a herbicide and a fertilizer, and each delivery system would be connected to a different one of the nozzles 82. The operator could then selectively operate appropriate trigger mechanisms to spray either or both liquids, as necessary.

In the operation of the illustrated apparatus, the hydraulic and electrical components of the apparatus are controlled by an operator in the cab 4 of the tractor 2. This can be accomplished in a known manner. The controls are used to pivot the turntable 5, the booms 8, 12, and the work head 20 to position the work head 20 and the blade 42 for cutting brush. The blade 42 is preferably operated by a hydraulic motor mounted in the housing 28. Upon the completion of cutting in an area that will require spraying, the operator stops the rotation of the blade 42 and positions the work head 20 for spraying the appropriate spots. The valve 65 and actuator 64 are operated to extend the sliding member 74 into its projecting use position shown in FIGS. 4, 6, and 7. Then the pump 88 is operated to spray liquid from the nozzles 82, as shown in FIGS. 6 and 10. Liquid may be sprayed from one or both nozzles 82 to vary the intensity of the spraying and the spray pattern. In addition, the nozzles 82 are preferably adjustable in a known manner to provide further adjustability of the spray pattern. As can be seen in FIGS. 4 and 6, when the sliding member 74 is in its use position, the nozzles 82 are aligned with the opening 40 and are above and laterally outward of the blade 42. In other words, a portion of the blade 42 extends radially outwardly through the opening 40, and the nozzles 82 are radially outward of the blade 42. When the sliding member 74 is retracted into its nonuse position, the member 74 and the nozzles 82 carried thereby are positioned above a portion of the housing 28.

As used herein, the terms horizontal, vertical, upper, lower, and the like refer to the work head orientation shown in FIGS. 1-3 and 6. They are used herein to facilitate the description of the structure and operation of the apparatus of the invention. They are in no way intended to restrict the use orientation of the work head of the invention to that illustrated in FIGS. 1-3 and 6.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A work head for a brush cutting machine, comprising:
   a housing;
   a cutting blade carried by said housing;
   said housing including a protective shroud with a vertical opening therein to expose a portion of said blade to enable said blade to cut brush;
   a spray nozzle carried by said housing and having a spray position in which said nozzle is substantially aligned with said opening above and outward of said portion of said blade; and an activator remote from said housing and operatively connected to said nozzle for selectively spraying liquid therefrom.

2. The work head of claim 1, in which said nozzle is slidably retractable into a nonuse position.

3. The work head of claim 2, in which said vertical opening in said shroud extends through a side portion of said shroud; and, in said spray position, said nozzle is positioned laterally outwardly of said portion of said blade.

4. The work head of claim 1, in which said vertical opening in said shroud extends through a side portion of said shroud; and, in said spray position, said nozzle is positioned laterally outwardly of said portion of said blade.

5. The work head of claim 4, in which said blade is a generally circular rotary cutting blade mounted to rotate about a vertical axis and to extend radially outwardly through said vertical opening.

6. The work head of claim 5, in which said nozzle is slidably retractable into a nonuse position.

7. The work head of claim 1, in which said blade is a generally circular rotary cutting blade mounted to rotate about a vertical axis and to extend radially outwardly through said vertical opening.

8. The work head of claim 7, in which said nozzle is slidably retractable into a nonuse position.

9. The work head of claim 1, in which said nozzle is adjustable to provide an adjustable spray pattern of said liquid.

10. The work head of claim 9, which comprises a plurality of nozzles having said spray position.

11. The work head of claim 1, which comprises a plurality of nozzles having said spray position.

12. The work head of claim 1, further comprising a gripping jaw carried by a lower portion of said housing; and a thumb pivotally mounted on said housing to pivot from a nonuse position, in which said thumb is at least substantially flush against an upper portion of said housing, toward said jaw to thereby grip cut brush and other debris between said thumb and said housing.

13. The combination of the work head recited in claim 1, and a boom having an end portion to which said work head is pivotally attached.

14. The combination of claim 13, in which said nozzle is slidably retractable into a nonuse position.

15. The combination of claim 14, in which said vertical opening in said shroud extends through a side portion of said shroud; and, in said spray position, said nozzle is positioned laterally outwardly of said portion of said blade.

16. The combination of claim 13, in which said vertical opening in said shroud extends through a side portion of said shroud; and, in said spray position, said nozzle is positioned laterally outwardly of said portion of said blade.

17. The combination of claim 16, in which said blade is a generally circular rotary cutting blade mounted to rotate about a vertical axis and to extend radially outwardly through said vertical opening.

18. The combination of claim 17, in which said nozzle is slidably retractable into a nonuse position.

19. The combination of claim 13, in which said blade is a generally circular rotary cutting blade mounted to rotate about a vertical axis and to extend radially outwardly through said vertical opening.

20. The combination of claim 19, in which said nozzle is slidably retractable into a nonuse position.

21. The combination of claim 13, further comprising a gripping jaw carried by a lower portion of said housing; and a thumb pivotally mounted on said housing to pivot from a nonuse position, in which said thumb is at least substantially flush against an upper portion of said housing, toward said jaw to thereby grip cut brush and other debris between said thumb and said housing.

22. Brush cutting apparatus comprising the combination of:
   a boom having opposite end portions; and
   a work head pivotally attached to one of said end portions, said work head including:
   a housing;
   a cutting blade carried by said housing;
   said housing including a protective shroud surrounding a portion of said blade;
   a spray nozzle mounted on said housing; said nozzle being slidable between a nonuse position in which said nozzle is positioned above a portion of said housing, and a spray position in which said nozzle projects horizontally outwardly from said housing to permit liquid to be sprayed downwardly from said nozzle onto cut brush; and
   an activator remote from said housing and operatively connected to said nozzle for selectively spraying liquid therefrom.

23. The apparatus of claim 22, in which, in said spray position, said nozzle projects laterally outwardly from said housing.

24. A work head for a brush cutting machine, comprising a housing; a cutting blade carried by said housing; a gripping jaw carried by a lower portion of said housing; a thumb pivotally mounted on said housing to pivot about a horizontal axis from a nonuse position, in which said thumb is at least substantially flush against an upper portion of said housing, toward said jaw to thereby grip cut brush and other debris between said thumb and said housing; and an actuator mounted inside said housing and connected to said thumb to pivot said thumb about said axis.

* * * * *